United States Patent
Chang

(10) Patent No.: US 10,048,421 B2
(45) Date of Patent: Aug. 14, 2018

(54) LIGHT GUIDE UNIT AND BACKLIGHT MODULE WITH THE SAME

(71) Applicant: HON HAI PRECISION INDUSTRY CO., LTD., New Taipei (TW)

(72) Inventor: Jen-Tsorng Chang, New Taipei (TW)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 323 days.

(21) Appl. No.: 14/834,588

(22) Filed: Aug. 25, 2015

(65) Prior Publication Data

US 2016/0349425 A1    Dec. 1, 2016

(30) Foreign Application Priority Data

May 26, 2015   (CN) .......................... 2015 1 0273298

(51) Int. Cl.
*F21V 8/00* (2006.01)

(52) U.S. Cl.
CPC .......... *G02B 6/001* (2013.01); *G02B 6/0006* (2013.01)

(58) Field of Classification Search
CPC .............................. G02B 6/0006; G02B 6/001
See application file for complete search history.

(56) References Cited

U.S. PATENT DOCUMENTS

2015/0062956 A1*   3/2015   Genier ................. G02B 6/0006
                                                          362/554

* cited by examiner

*Primary Examiner* — Thomas M Sember
(74) *Attorney, Agent, or Firm* — ScienBiziP, P.C.

(57) ABSTRACT

A light guide unit includes a frame having a groove and sidewalls around the groove and a light guide plate carried in the frame. The sidewalls define at least one hole therein. The light guide plate includes at least one light guide fiber arranged in the groove and an optical rubber filling in the groove and covering the light guide fiber. Each light guide fiber has a first optical coupling end extending out of the frame through the hole configured for light penetrating into therein.

7 Claims, 11 Drawing Sheets

LIGHT GUIDE UNIT AND BACKLIGHT MODULE WITH THE SAME

CROSS-REFERENCE TO RELATED APPLICATIONS

This application claims priority to Chinese Patent Application No. 201510273298.8 filed on May 26, 2015, the contents of which are incorporated by reference herein.

FIELD

The subject matter herein generally relates to an light guide unit and a backlight module with the light guide unit.

BACKGROUND

Electronic devices can be made with a display screen. The display screen can occupy a substantial portion of one surface. The display screen requires illumination which is typically supplied by a backlight.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. The description is not to be considered as limiting the scope of the embodiments described herein.

Figure 1:
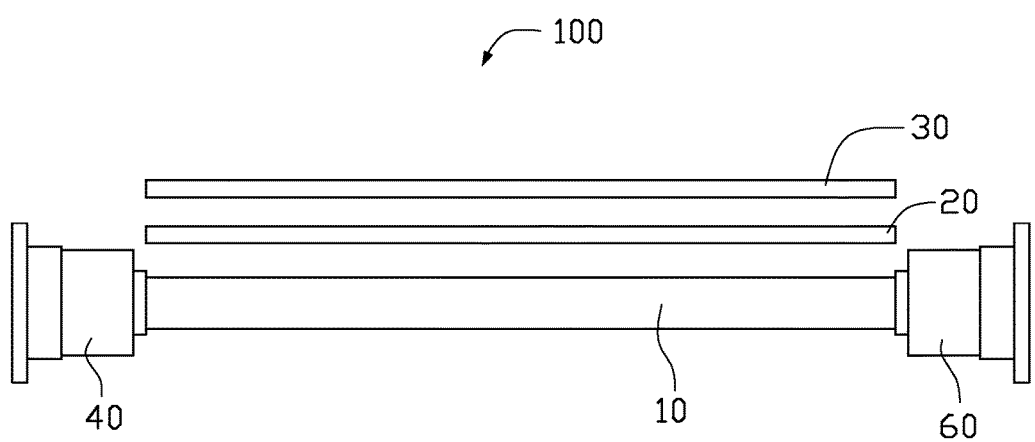
FIG. 1 is a diagrammatic view of a backlight module with a light guide unit in accordance with an exemplary embodiment of the present disclosure.

Referring to FIG. 1, a backlight module 100 is provided in the present disclosure. The backlight module 100 includes a light guide unit 10, a diffuse film 20, a brightness enhancement film 30 and a light source unit 40. The diffuse film 20 and the brightness enhancement film 30 are successively stacked on the light guide unit 10. The light source unit 40 is positioned at one side of the light guide unit 10.

Figure 2:
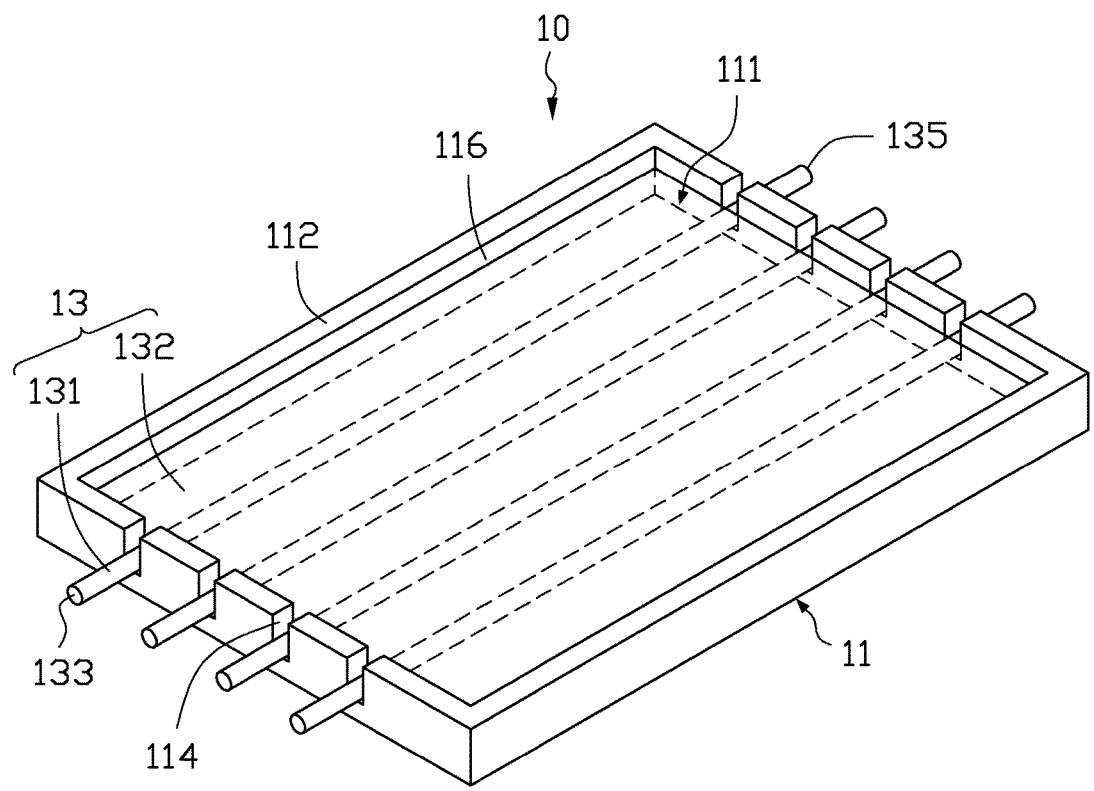
FIG. 2 is a diagrammatic view of a first embodiment of the light guide unit of FIG. 1.
Figure 3:
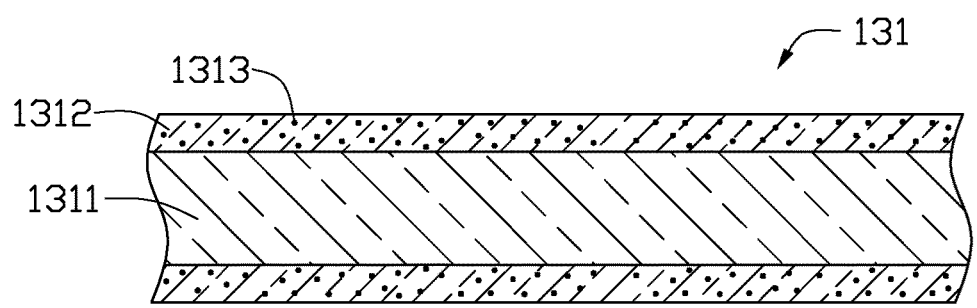
FIG. 3 is a cross sectional view showing a portion of a light guide fiber of FIG. 2.

Referring to FIGS. 2-3, the light guide unit 10 includes a frame 11 and a light guide plate 13 carried in the frame 11. The frame 11 has a groove 111 configured for receiving the light guide plate 13 and sidewalls 112 around the groove 111. A height of the groove 111 is less than 300 micrometers. The sidewalls 112 have a reflector 116 facing the groove 111. The reflector 116 can be made of a light reflecting coating. The frame 11 can be made of metal, glass or plastic. At least one hole 114 is defined in at least one sidewall 112.

The light guide plate 13 includes at least one light guide fiber 131 arranged in the groove 111 and an optical rubber 132 filling in the groove 111 and covering the light guide fiber 131. Each light guide fiber 131 has a first optical coupling end 133 configured for light penetrating into the light guide fiber 131. The first optical coupling end 133 of the light guide fiber 131 extends out of the frame 11 through the 114. Light emitted from the light source unit 40 penetrates into the first optical coupling end 133 of light guide fiber 131 and exits from the light guide fiber 131 in a cylindrical surface 137 of the light guide fiber 131.

The light guide fiber 131 can include a light guide core 1311 and a light guide coating 1312 covering the light guide core 1311. The light guide coating 1312 can have a plurality of light diffusing particles 1313 configured for increasing a uniformity of a light brightness of the light guide fiber 131. As one moves in a direction away from the first optical coupling end 133 along the light guide fiber 131, the number of the light diffusing particles 1313 in the light guide coating 1312 gradually increases. The light guide fiber 131 can be made of glass light diffusing fiber made in Corning Incorporated or plastic light diffusing fiber.

The optical rubber 132 fills in the groove 111 and combined with the light guide fiber 131. The optical rubber 132 can have a plurality of scattered particles or quantum particles.

A diameter of the light guide fiber 131 can be larger than or equal to seventy-five (75) micrometers. A thickness of the light guide plate 13 can be larger than or equal to one hundred-twenty-five (125) micrometer.

In a first embodiment of the light guide unit 10 of the backlight module 100, for example as illustrated by FIG. 2, the light guide unit 10 includes a plurality of light guide fibers 131. The holes 114 are arranged at one sidewall 112 and another sidewall 112 opposite to the one sidewall 112. One hole 114 in the one sidewall 112 is aligned with one corresponding hole 114 in the other sidewall 112. The light guide fibers 131 are parallel to each other and spaced from each other. Each light guide fiber 131 can further include a second optical coupling end 135 for light exiting from the light guide fiber 131. The first optical coupling end 133 and the second optical coupling end 135 respectively extend out of the frame 11 through the hole 114 in the one sidewall 112 and the hole 114 in the other sidewall 112.

Figure 4:
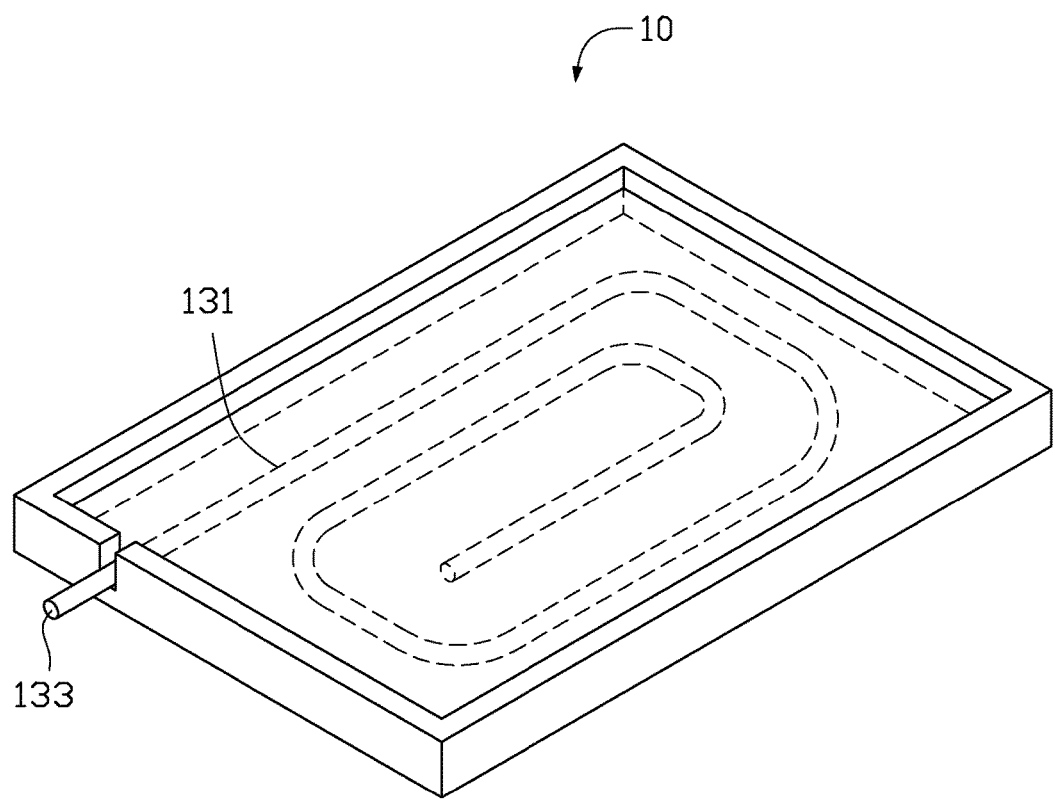
FIG. 4 is a diagrammatic view of a second embodiment of the light guide unit of FIG. 1.

In a second embodiment of the light guide unit 10 of the backlight module 100, for example as illustrated by FIG. 4, the light guide unit 10 includes one light guide fiber 131. One hole 114 is arranged at one sidewall 112. The light guide fiber 131 is circled in the groove 111. The first optical coupling end 133 extends out of the frame 11 through the hole 114.

Figure 5:
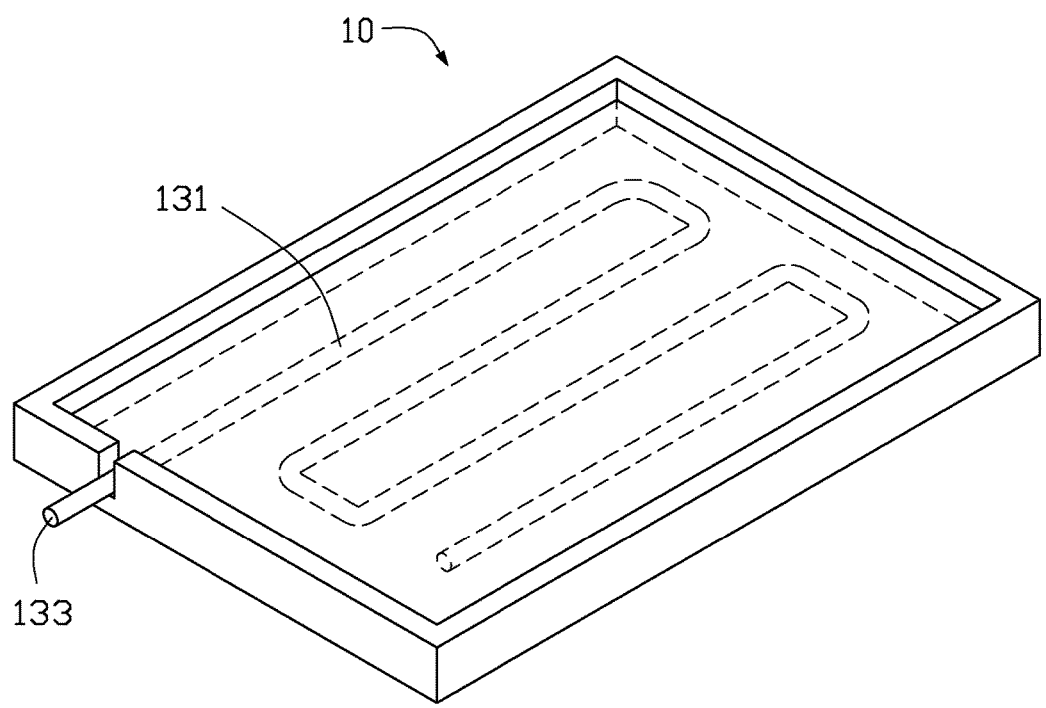
FIG. 5 is a diagrammatic view of a third embodiment of the light guide unit of FIG. 1.

In a third embodiment of the light guide unit 10 of the backlight module 100, for example as illustrated by FIG. 5, the light guide unit 10 includes one light guide fiber 131. One hole 114 is arranged at one sidewall 112. The light guide fiber 131 is arranged as a wave line. The first optical coupling end 133 extends out of the frame 11 through the hole 114.

Figure 6:
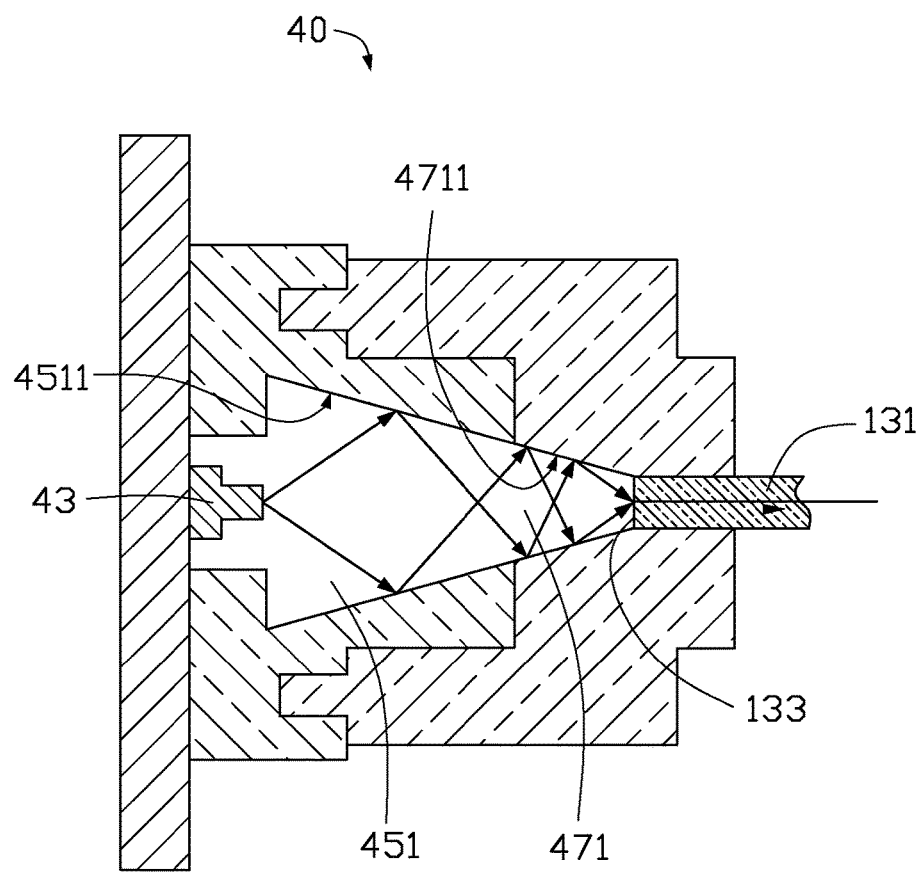
FIG. 6 is a cross sectional view showing a first embodiment of a light source unit of FIG. 1.

FIG. 6 illustrates the light source unit 40 positioned at the first optical coupling end 133 of the light guide fiber 131. The light source unit 40 includes a first substrate 41, a light emitting source 43, a first light component 45 and a second light component 47. The light emitting source 43, the first light component 45 and the second light component 47 are carried on the first substrate 41. The light source unit 40 can further include a driving device (not shown) carried on the first substrate 41.

The light emitting source 43 can be a light emitting diode or a laser diode. The first light component 45 and the second light component 47 can be transparent and made of resin. In at least one embodiment, a first through hole 451 can be defined in the first light component 45. The light emitting source 43 is received in the first through hole 451 and faces the second light component 47. A second through hole 471 can be defined in the second light component 47. The first optical coupling end 133 of the light guide fiber 131 is received in the second through hole 471 and faces the first light component 45. Light emitted from the light emitting source 43 can enter into and transmit through the first through hole 451 and the second through hole 471, and then the light can penetrate into the first optical coupling end 133 of the light guide fiber 131. In at least one embodiment, the first through hole 451, the second through hole 471 and the light guide fiber 131 can be coaxial with each other.

The first light component 45 can include a plurality of first fixing portions 453. The second light component 47 can include a plurality of second fixing portions 473. One of the plurality of first fixing portion 453 can correspond to one of the plurality of second fixing portion 473 and be fixed on the one of the plurality of second fixing portions 473 configured to assemble the first light component 45 to the second light component 47. In at least one embodiment, the first fixing portion 453 can be a fixing hole, and the second fixing portion 473 can be a fixing pin. The second fixing portion 473 inserts into the first fixing portion 453 and is configured to assemble the first light component 45 to the second light component 47.

In a first embodiment of the light source unit 40 of the backlight module 100, for example as illustrated by FIG. 6, the first through hole 451 and the second through hole 471 can form a truncated conical hole together. The first through hole 451 can have a first inner surface 4511. The first inner surface 4511 can be a reflective surface. The second through hole 471 can have a second inner surface 4711. The second inner surface 4711 can be a reflective surface. Light emitted from the light emitting source 43 can be reflected by the first inner surface 4511 to reach the second inner surface 4711, and then reflected by the second inner surface 4711 to reach and penetrates into the first optical coupling end 133 of the light guide fiber 131.

Figure 7:
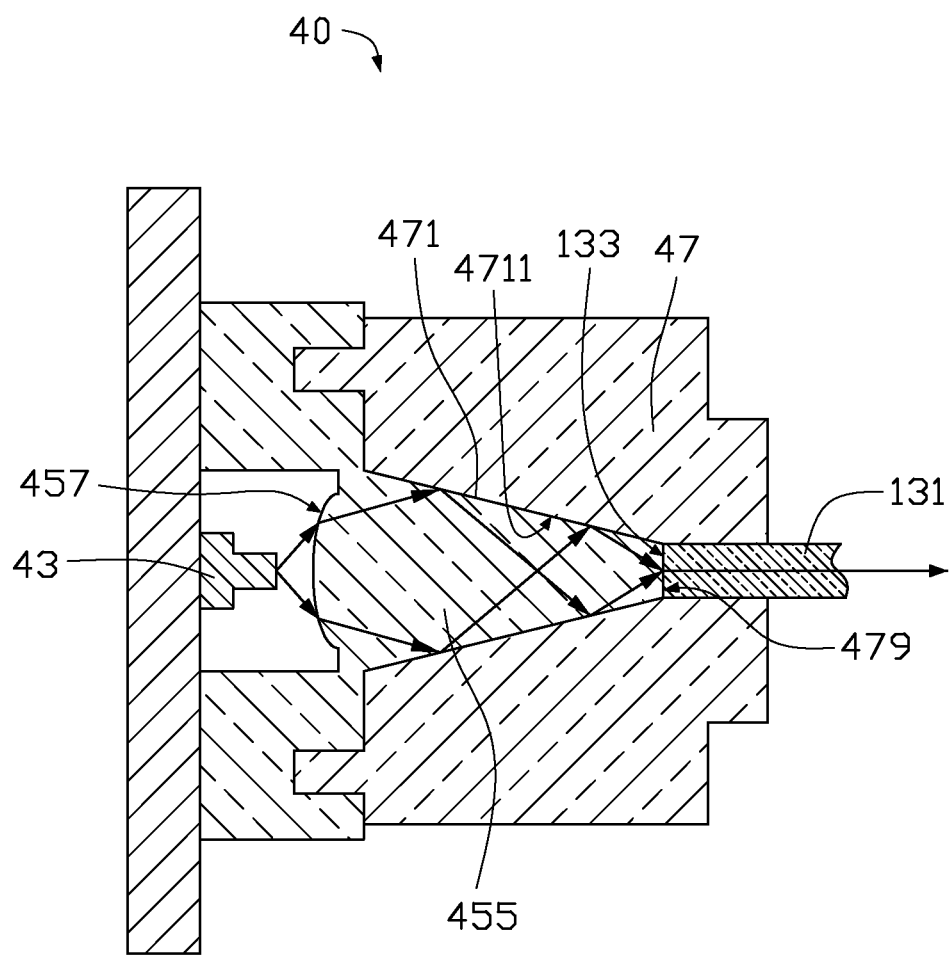
FIG. 7 is a cross sectional view showing a second embodiment of a light source unit of FIG. 1.

In a second embodiment of the light source unit 40 of the backlight module 100, for example as illustrated by FIG. 7, the light source unit 40 further includes a first lens 455. The light emitting source 43 and the first lens 455 are received in the first through hole 451. The first lens 455 and the first light component 45 can be a one piece case. The second through hole 471 can be a truncated conical hole. The first lens 455 extends into and fills the second through hole 471 of the second light component 47. The first lens 455 has a first surface 457 and a second surface 459. The first surface 457 faces the light emitting source 43. The first surface 457 is a convex curved surface. The second surface 459 faces the light guide fiber 131. The second surface 459 is a flat surface. The second surface 459 attaches the first optical coupling end 133 of the light guide fiber 131.

Figure 8:
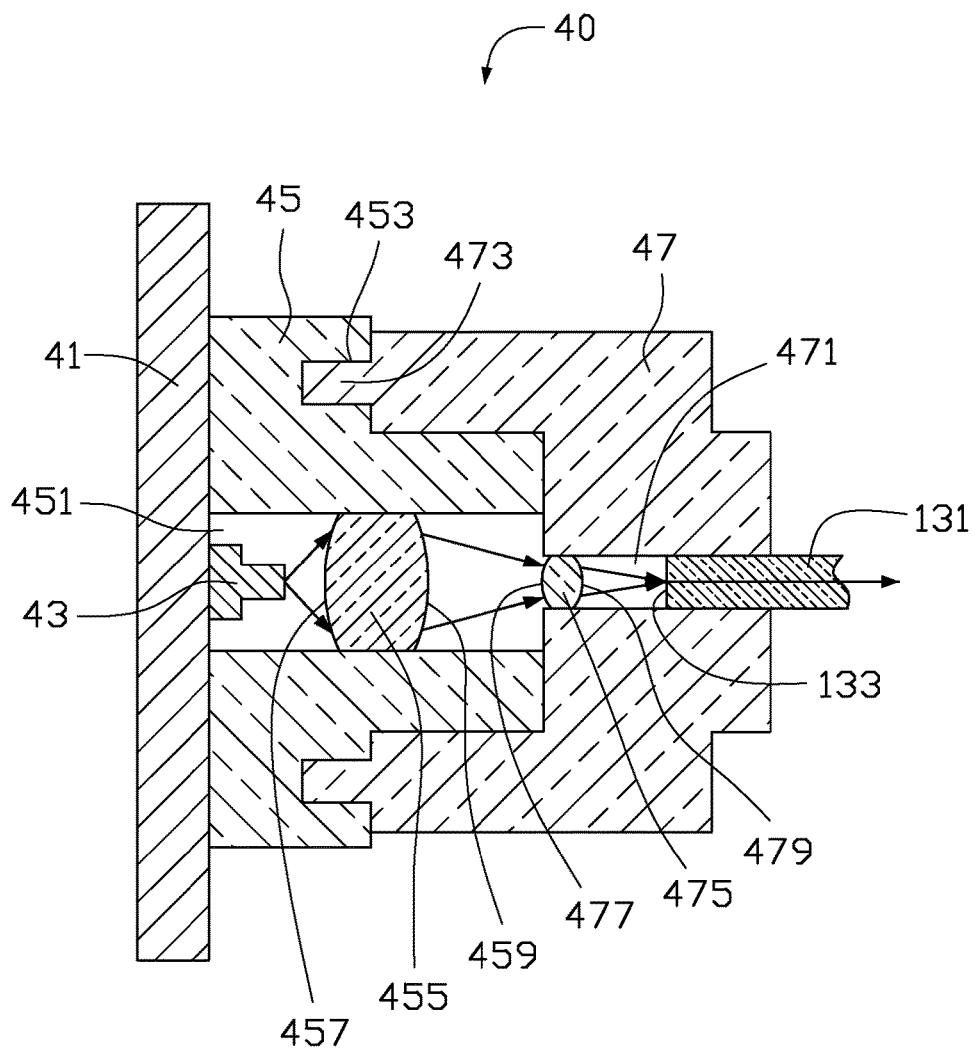
FIG. 8 is a cross sectional view showing a third embodiment of a light source unit of FIG. 1.

In a third embodiment of the light source unit 40 of the backlight module 100, for example as illustrated by FIG. 8, the light source unit 40 further includes a first lens 455 and a second lens 475. The light emitting source 43 and the first lens 455 are received in the first through hole 451. The second lens 475 and the first optical coupling end 133 of the light guide fiber 131 are received in the second through hole 471. The first lens 455, the second lens 475 and the light guide fiber 131 are positioned at a light path of the light emitting source 43. Light emitted from the light emitting source 43 penetrates into the first lens 455 and is refracted by the first lens 455, and light refracted from the first lens 455 penetrates into the second lens 475 and is refracted by the second lens 475. Then, light refracted from the second lens 475 penetrates into the first optical coupling end 133 of the light guide fiber 131. The first lens 455 is spaced apart from the light emitting source 43 and the second lens 475. The second lens 475 is spaced from the first optical coupling end 133 of the light guide fiber 131.

The first lens 455 has a first surface 457 and a second surface 459. The first surface 457 faces the light emitting source 43. The second surface 459 faces the second lens 475. Each of the first surface 457 and the second surface 459 is a convex curved surface. Light emitted from the light emitting source 43 can be converged by the first lens 455. The second lens 475 has a third surface 477 and a fourth surface 479. The third surface 477 faces the second surface 459 of the first lens 455. The fourth surface 479 face the first optical coupling end 133 of the light guide fiber 131. Each of the third surface 477 and the fourth surface 479 is a convex curved surface. Light refracted by the first lens 455 can be converged by the second lens 475.

Figure 9:
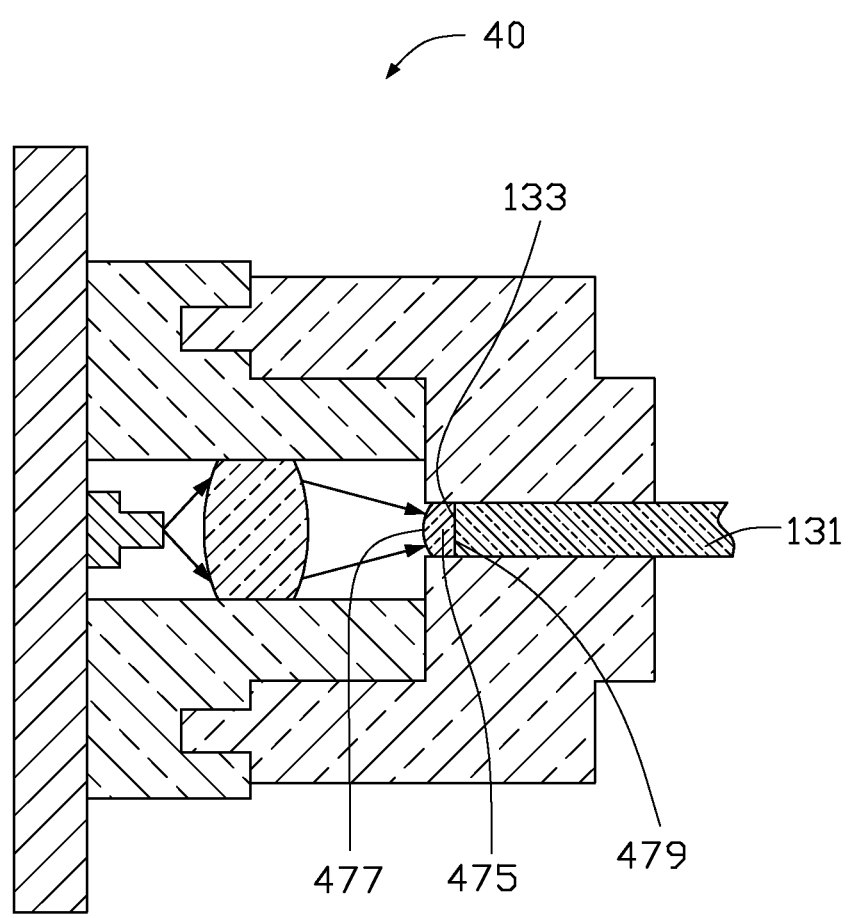
FIG. 9 is a cross sectional view showing a fourth embodiment of a light source unit of FIG. 1.

In a fourth embodiment of the light source unit 40 of the backlight module 100, for example as illustrated by FIG. 9, the light source unit 40 illustrated in FIG. 9 is similar to the light source unit 40 illustrated in FIG. 8, but the second lens 475 attaches the first optical coupling end 133 of the light guide fiber 131. In at least one embodiment, the fourth surface 479 can be a flat surface, and attaches the first optical coupling end 133 of the light guide fiber 131.

Figure 10:
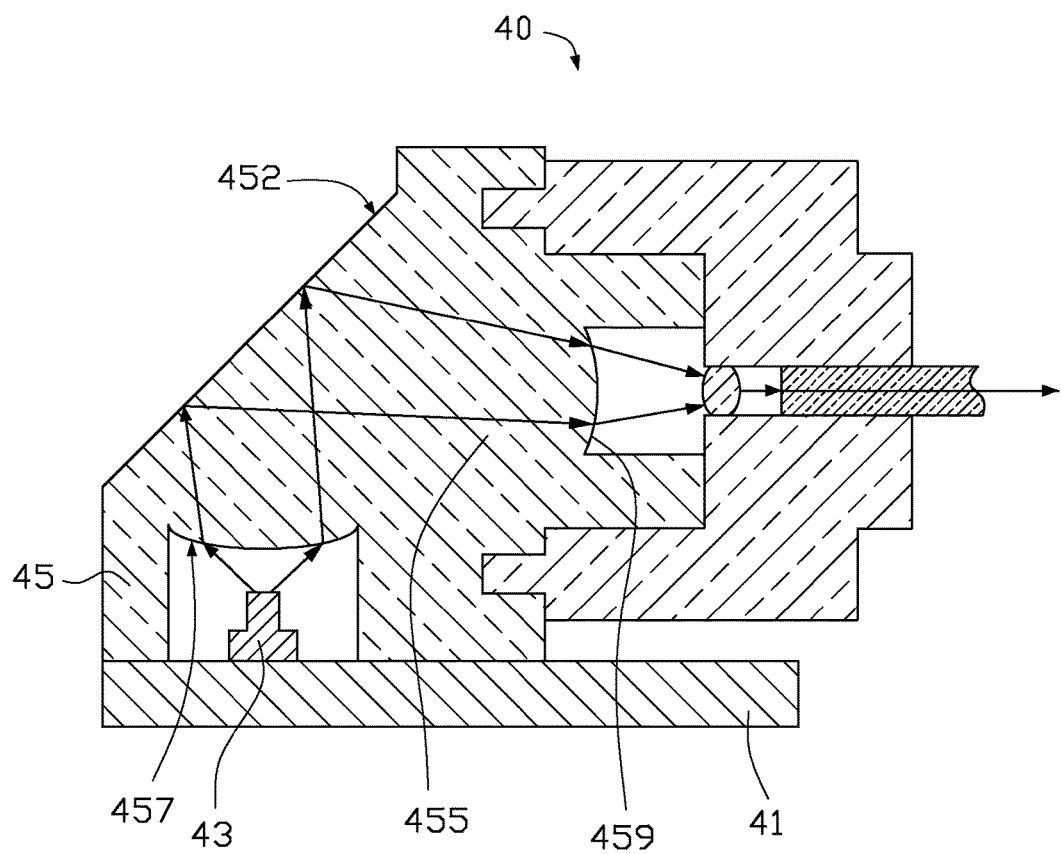
FIG. 10 is a cross sectional view showing a fifth embodiment of a light source unit of FIG. 1.

In a fifth embodiment of the light source unit 40 of the backlight module 100, the light source unit 40 illustrated in FIG. 10 is similar to the light source unit 40 illustrated in FIG. 8, but the first lens 455 and the first light component 45 illustrated in FIG. 10 is a one piece case. In at least one embodiment, the first light component 45 can include a reflective surface 452. The reflective surface 452 can be inclined to the first substrate 41. Light emitted from the light emitting source 43 penetrates into first lens 455 in the first surface 457 and is refracted by the first surface 457 to reach the reflective surface 452, and reflected by reflective surface 452 to reach the second surface 459 and refracted by the second surface 459 to exits from the first lens 455.

Figure 11:
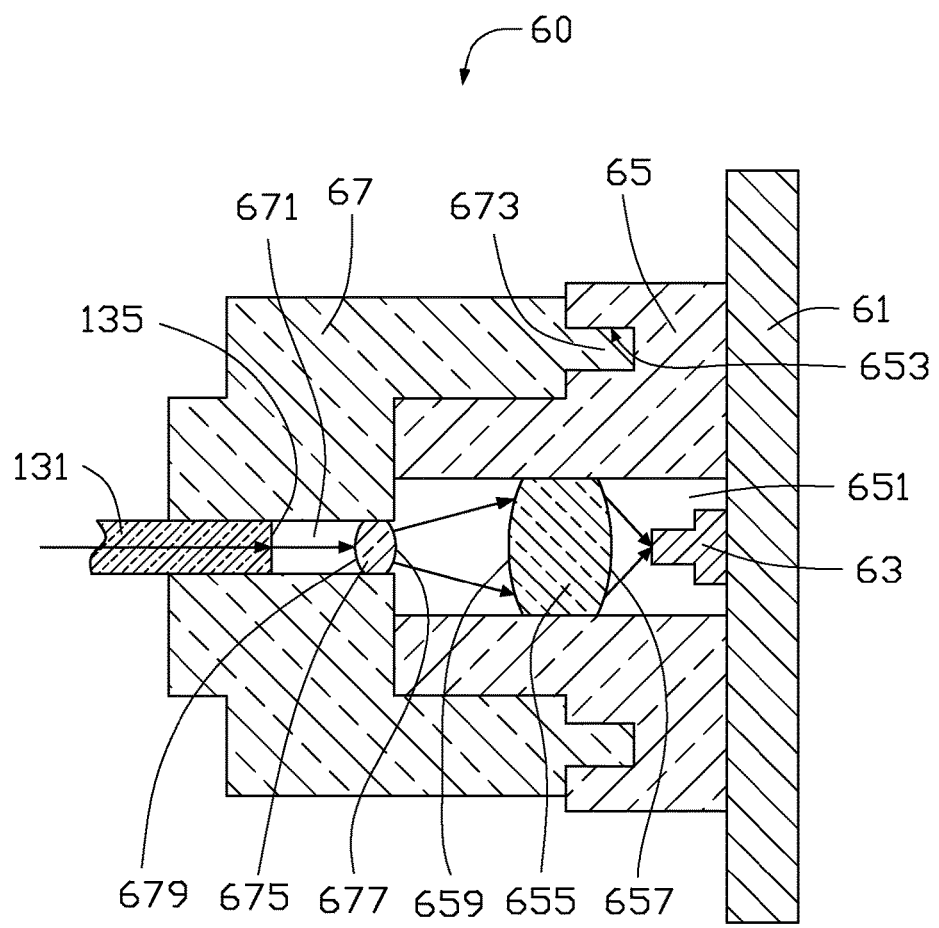
FIG. 11 is a cross sectional view showing a detecting unit of FIG. 1.

Referring to FIG. 11, the backlight module 100 can further include a plurality of detecting unit 60. One light source unit 40 and one detecting unit 60 can be corresponding to one light guide fiber 131. The light source unit detecting unit 60 is positioned at one side opposite to the side positioned the light emitting source of the light guide unit 10. The detecting unit 60 is positioned at the second optical coupling end 135 of the light guide fiber 131. The detecting unit 60 includes a second substrate 61, a detecting component 63, a third light element 65 and a fourth light element 67. The detecting component 63, the third light element 65 and the fourth light element 67 are carried on the second substrate 61.

The detecting component 63 can be a optoelectronic element configured to convert a light signal to an electrically signal, and calculating the electrically signal, and controlling a light brightness of the light emitting source 43, and then adjusting a brightness of the light guide plate 13. The third light element 65 and the fourth light element 67 is used for guiding light exiting from the light guide fiber 131 to be transmitted to the detecting component 63. Light exiting from the second optical coupling end 135 of the light guide fiber 131 enters into the fourth light element 67 and enters into the third light element 65, and then enters into the detecting component 63.

The third light element 65 further includes a plurality of third fixing portions 653. The fourth light element 67 further includes a plurality of fourth fixing portions 673. Each third fixing portion 653 is corresponding to each fourth fixing portion 673 and fixed on the fourth fixing portion 673 configured for assembling the third light element 65 with the fourth light element 67. In at least one embodiment, the third fixing portion 653 can be a fixing hole, and the fourth fixing portion 673 can be a fixing pin. The fourth fixing portion 673 inserts into the third fixing portion 653 for combining the third light element 65 with the fourth light element 67.

The detecting unit 60 further includes a second light regulating element 69. The second light regulating element 69 includes a third lens 655 and a fourth lens 675. A third through hole 651 is defined in the third light element 65. The detecting component 63 and the third lens 655 are received in the third through hole 651. A fourth through hole 671 is defined in the fourth light element 67. The fourth lens 675 and the second optical coupling end 135 of the light guide fiber 131 are received in the fourth through hole 671. The third through hole 651, the fourth through hole 671 and the light guide fiber 131 are coaxial with each other. The third lens 655 is spaced from the detecting component 63 and the fourth lens 675. The fourth lens 675 is spaced from the second optical coupling end 135 of the light guide fiber 131. Light exiting from the light guide fiber 131 penetrates into the fourth lens 675 and is refracted by the fourth lens 675, and light refracted from the fourth lens 675 penetrates into the third lens 655 and is refracted by the third lens 655, and then light refracted from the third lens 655 penetrates into the detecting component 63.

The third lens 655 has a seventh surface 659 and a eighth surface 657. The eighth surface 657 faces the detecting component 63. The seventh surface 659 faces the fourth lens 675. Each of the eighth surface 657 and the seventh surface 659 is a convex curved surface. The fourth lens 675 has a sixth surface 677 and a fifth surface 679. The sixth surface 677 faces the seventh surface 659 of the third lens 655. The fifth surface 679 face the second optical coupling end 135 of the light guide fiber 131. Each of the sixth surface 677 and the fifth surface 679 is a convex curved surface.

The embodiments shown and described above are only examples. Many details are often found in the art such as the other features of a light guide unit and a backlight module with the light guide unit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A light guide unit comprising:
   a frame forming a groove and having sidewalls around the groove, the sidewalls defining at least one hole therein; and
   a light guide plate received in the frame, the light guide plate comprising:
   at least one light guide fiber arranged in the groove and each light guide fiber having a first optical coupling end extending out of the frame through the at least one hole; and
   an optical rubber mounted in the groove and configured to cover the light guide fiber.

2. The light guide unit of claim 1, wherein a diameter of the light guide fiber can be larger than or equal to seventy-five micrometers, a thickness of the light guide plate can be larger than or equal to one hundred-twenty-five micrometer, a height of the groove is less than 300 micrometers, the sidewalls have a reflector facing the groove.

3. The light guide unit of claim 1, wherein the light guide fiber comprises a light guide core and a light guide coating covering the light guide core, the light guide coating has a plurality of light diffusing particles configured for increasing a uniformity of a light brightness of the light guide fiber.

4. The light guide unit of claim 3, wherein as one moves in a direction away from the first optical coupling end along the light guide fiber, the number of the light diffusing particles in the light guide coating gradually increases.

5. The light guide unit of claim 1, wherein the light guide unit comprises a plurality of light guide fibers, the holes are arranged at one sidewall and another sidewall opposite to the one sidewall, one hole in the one sidewall is aligned with one corresponding hole in the other sidewall.

6. The light guide unit of claim 5, wherein each light guide fiber further comprises a second optical coupling end for light exiting from the light guide fiber, the first optical coupling end and the second optical coupling end respectively extend out of the frame through the holes in the two sidewalls opposite to each other.

7. The light guide unit of claim 1, wherein the light guide unit comprises one light guide fiber, one hole is arranged at one sidewall, the first optical coupling end extends out of the frame through the hole, and the light guide fiber is circled in the groove or arranged as a wave line.

* * * * *